United States Patent [19]
Monnet

[11] 3,831,440
[45] Aug. 27, 1974

[54] APPARATUS FOR MONITORING CARBURETORS OR OTHER GASOLINE-CONSUMPTION DEVICES

[76] Inventor: Francois Monnet, 1 Rue Grounod, 06 Nice, France

[22] Filed: Nov. 21, 1972

[21] Appl. No.: 308,406

[30] Foreign Application Priority Data
Nov. 21, 1971  France .............................. 71.42994

[52] U.S. Cl. ................................................. 73/113
[51] Int. Cl. ......................................... G01m 17/00
[58] Field of Search ............................. 73/118, 113

[56] References Cited
UNITED STATES PATENTS

| | | | |
|---|---|---|---|
| 2,048,445 | 7/1936 | Green .............................. | 73/118 X |
| 2,073,243 | 3/1937 | Liddell et al. ..................... | 73/118 X |
| 2,445,943 | 7/1948 | Edelen ................................ | 73/118 |
| 3,469,442 | 9/1969 | Brueckner ........................... | 73/118 |
| 3,646,600 | 2/1972 | Bier et al. .......................... | 73/118 |
| 3,691,824 | 9/1972 | Vanderbilt, Jr. et al. ............. | 73/118 |

Primary Examiner—Jerry W. Myracle
Attorney, Agent, or Firm—Young and Thompson

[57] ABSTRACT

Apparatus for monitoring the regulating carburetors or other gasoline-consumption devices comprises a graduated test tube adapted to be subjected at its upper part to a predetermined pressure by its connection with the float chamber of the carburetor or the like. A gasoline inlet tube opens at its upper end into the test tube, for discharging its gasoline therein. A tank for containing gasoline is provided, and there is a direct first connection between the lower end of the gasoline inlet tube and the base of the tank, and a second connection between the lower end of the gasoline inlet tube and the upper part of the tank. There are a number of valves including a valve within the second connection so as to enable, by a simple manipulation of the valves, a quantity of gasoline to be obtained in the test tube at a strictly metered and constant pressure.

9 Claims, 7 Drawing Figures

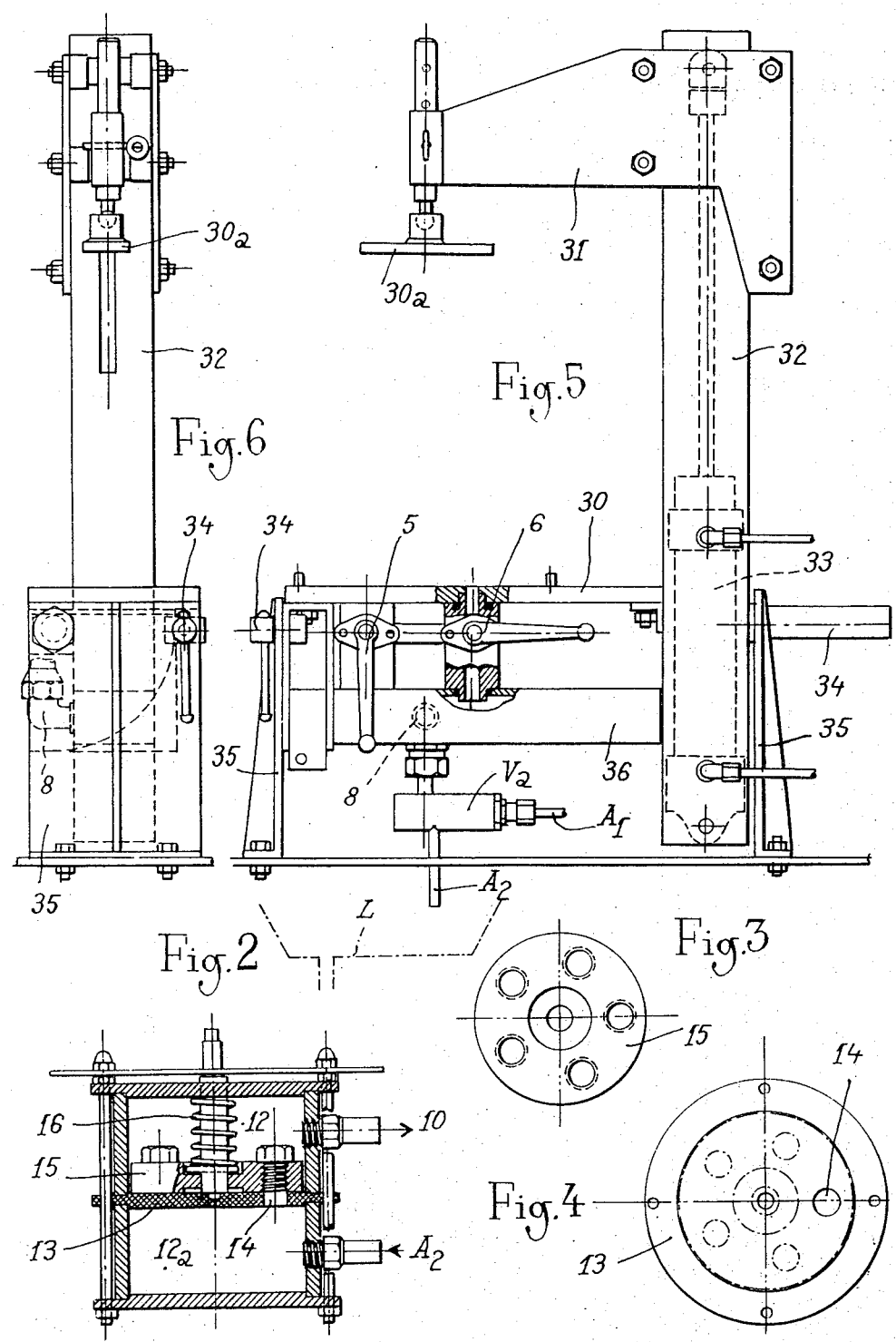

APPARATUS FOR MONITORING CARBURETORS OR OTHER GASOLINE-CONSUMPTION DEVICES

This invention relates to a measuring apparatus for monitoring and regulating carburetors.

According to the invention there is provided a measuring apparatus for monitoring and regulating carburetors or other gasoline-consumption devices, comprising a graduated test tube adapted to be subjected at its upper part to a predetermined pressure by its connection with the float chamber of the carburetor or the like, a gasoline inlet tube which, at its upper end opens into the test tube for discharging its gasoline therein, a tank for containing gasoline, a direct first connection between the lower end of the gasoline inlet tube and the base of the tank, a second connection between the lower end of the gasoline inlet tube and the upper part of the tank, and a number of valves including a valve within the second connection, so as to enable, by a simple manipulation of the valves, a quantity of gasoline to be obtained in the test tube at a strictly metered and constant pressure.

An embodiment of the invention will now be described, by way of example, with reference to the accompanying drawings, in which:

FIGS. 2, 3 and 4 show the drum unit carrying the standard jets;

FIGS. 5 and 6 show in side and front elevation respectively the adjustable support on which the carburetor under test is held by a pneumatic jack.

Figure 1:
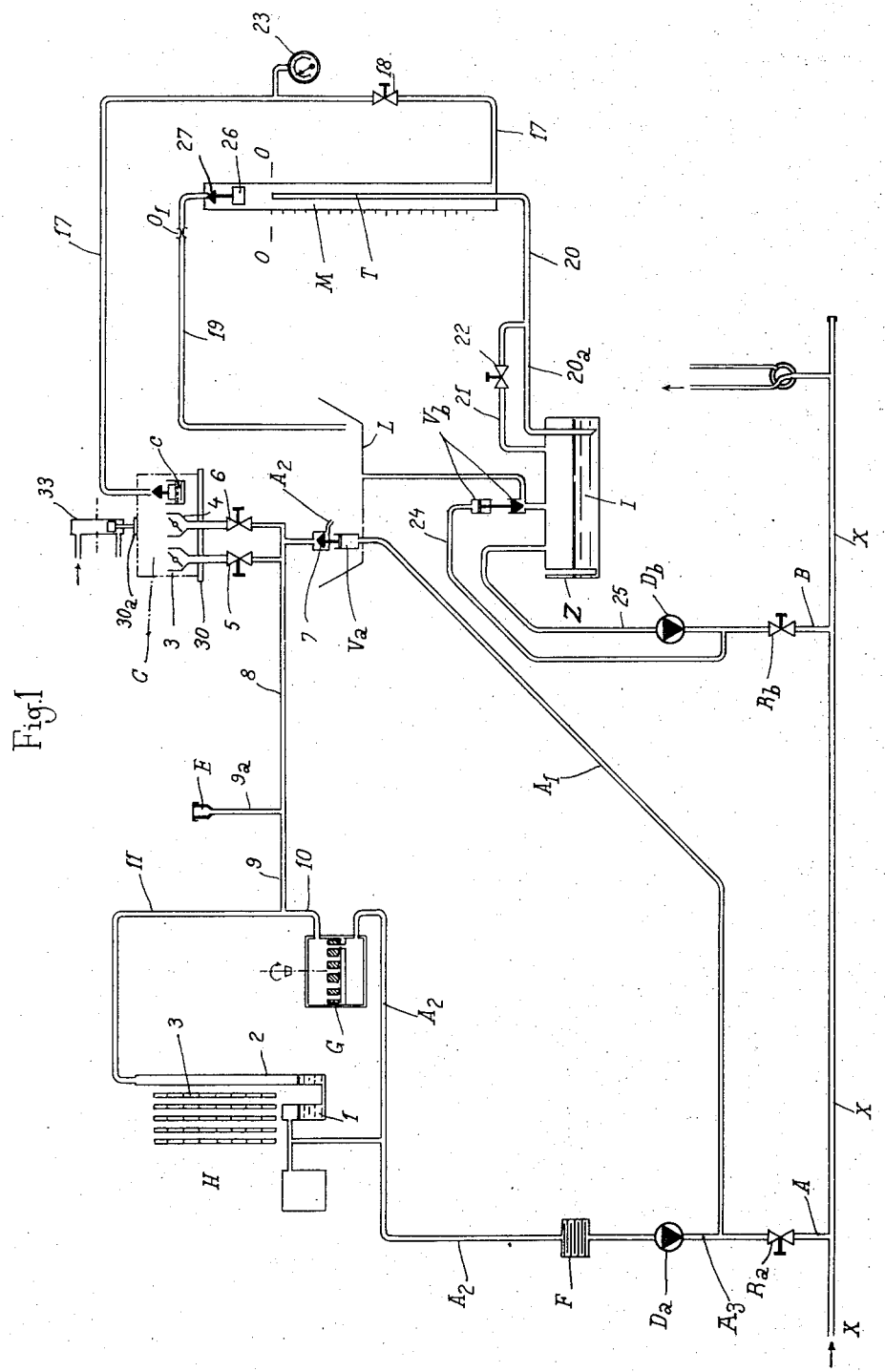
FIG. 1 is a diagram showing the various components of the apparatus and their connection by conduits having expansion valves, manually operated valves, and automatic pneumatically operated valves.

An air intake pipe X, e.g., at 6 kg. pressure, has two branches, A for air measurement, and B for gasoline measurement, controlled by respective valves $R_a$ and $R_b$.

A carburetor C to be tested is of the twin-choke downdraft type. $D_a$ is an expansion valve, F a filter and G a drum unit carrying a series of calibrated jets which can be put in circuit one by one, serving as standards for comparison with the jet to be tested, placed in an airway E with automatic closure by an airtight plug or with opening of the carburetor's butterflies. $V_a$ is an automatic pneumatically operated valve which, when valve $R_a$ is opened, is closed. H is a flowmeter of a known type which comprises a vessel containing a liquid, a tube 2 and scale 3 for reading off the height of this liquid in tube 2. The jet to be tested is separated from the apparatus and mounted at E, and the apparatus is provided with several read-off scales corresponding to the different jets of drum G.

The expander $D_a$ is regulated so that, in the case of pressure drop, e.g., at filter F, the air pressure at the outlet of the drum jet reads for example 500 mm. of water.

A. AIR MEASUREMENT

It should first be noted that if there is no jet to be tested at E, the latter is automatically closed, along with the line 9a, and as valves 5 and 6 of carburetor C are also closed, and no air leak is occurring, the same static pressure is established at both ends of tube 2 of the flowmeter. Thus there is a balance of pressure between chamber 1 and tube 2.

1. Calibration of a Tested Jet

The difference in pressure drop is what will be measured, i.e., the difference in resistances offered to the passage of air through the jet to be tested, connected to E, and through one of the calibrated jets of the drum unit G, selected for its cross section which is appropriate to that of the jet under test. Placing the latter in E opens the connection between E and 9a.

Valve $R_a$ is opened; valve $V_a$, fed with compressed air through line $A_1$, closes at 7 all the passage of air through 8, 9 and 11 to the carburetor and the flowmeter. The air, under a pressure reduced, for example, to 500 mm. of water, thus passes through line $A_2$ and then successively through the standard jet of G, then through the test jet in E. The difference between the two pressure drops of the standard and tested jets creates, in lines 10 and 11, a low pressure proportional to the cross section of the jet tested, this low pressure causing a rise in the liquid in tube 2, which determines the measurement on the scale corresponding to the standard jet; thus comparison of the two gives the calibration of the jet tested, by its difference from the known one of the standard jet.

2. Effective Cross Section for Air Admission to the Carburetor Butterflies (or other comparable devices)

When E has no jet, line 9a is closed. When valve $R_a$ is opened, $V_a$ closes orifice 7. If valves 5 and 6 of the apparatus are then opened, or one of them, the resistance offered to the passage of air around butterflies 3 and 4 or one of them creates, as before, a low pressure in line 11 and from the reading taken, the cross section for air admission into the carburetor can be obtained.

FIGS. 2, 3 and 4 show the construction of the drum unit. It is a closed box whose compartments 12a and 12 for admission of air from line $A_2$ and outlet of air through line 10 are separated by a fixed diaphragm 13 which is traversed by a single hole 14, in which rotates a drum 15 bearing the standard jets. The drum is pressed against diaphragm 13 with a spring 16 ensuring a perfectly sealed joint between the two parts. By turning the drum, the selected standard jet may be turned opposite hole 14, incorporating it in the circuit between $A_2$ and 10.

B. GASOLINE MEASUREMENTS:

$D_b$ is an expansion valve reducing the air pressure in line X to a pressure of for example between zero and 500 millibars.

I is a closed tank, with a level indicator Z supplied with gasoline by a tank L when pneumatically operated valve $V_b$ is in the open, operational position.

M is the main unit of the gasoline-containing portion of the apparatus. It is a graduated test tube into which the gasoline is passed by an internal tube T whose upper end determines the level 0—0 selected as zero on the graduation.

At its lower end, test tube M is connected via line 17, fitted with a valve 18, with the float chamber c of carburetor C, and at its upper end with a line 19 which opens into vessel L. Tube T communicates directly through line 20–20a with the base of tank I and through line 20–21, fitted with a valve 22, with the upper part of this tank. A manometer 23 is connected to line 17.

Whatever the gasoline measurement to be effected, one must begin by filling the test tube to level 0—0 which marks the zero point of the graduation. For this purpose, valve $R_b$ is opened, at the same time as $V_b$ supplied by line 24 closes, and tank I is pressurized by line 25, valve 22 being closed. The pressure in the tank raises the gasoline through 20a and 20 in the tube T of the test tube, where it flows until its level in the test tube and in duct 17 (valve 18 remaining open) causes the float 26 to rise, closing by means of needle 27 the duct 19. If gasoline has previously passed into 19, it returns to tank L. Valve 18 is then closed, and valve 22 is opened. As the pressures between the top and bottom of test tube M and tank I are equal, all the gasoline above level 0—0 returns by gravity through tube T and line 20-20a into the tank 21.

On the other hand, the air continues to flow in through valve 22, duct 20 and tube T in the top of the test tube, and its pressure is maintained by a pressure drop due to the calibrated orifice $O_1$ in line 19, which opens to the atmosphere. The device is then ready for testing.

1. Loss of Gasoline in the Carburetor

When the carburetor C has been filled with gasoline by the operations described above, the valve 18 is closed, and if the manometer drops there is a leak, and in this case 18 is reopened and the descent of the liquid in the test tube T per unit of time is a measure of the magnitude of the leak. Alternatively, 18 being open, and 22 still open, if there is a leak, the liquid descends in the test tube T, being a measure of the magnitude of the leak.

2. Gasoline Consumption per Stroke of Accelerator Pump

The carburetor is filled as indicated in the previous paragraph. As valves 22 and 18 are open, and the gasoline is at level 0—0 in the test tube, on each pump stroke the gasoline descends in the test tube, and this quantity may simply be read.

During the previous tests, the gasoline flowed in part through open needle 7 and through branch $A_2$ into tank L. When the test is finished, $R_b$ is closed, valve $V_b$ opens and the gasoline descends again by gravity from the vessel into the tank I.

3. Carburetor Seating

The apparatus may be used to test carburetors of all types. In order to facilitate preparation of the test, there has been provided according to the invention the following device for supporting the carburetor, and for keeping it in position, as shown in FIGS. 5 and 6. When the carburetor has been placed on a suitably shaped support 30, it is clamped on it by a plate 30a carried by an arm 31, and urged towards a support 30 along a slide 32 by a pneumatic jack 33. The support 30 is mounted to rotate around an axis 34—34, carried by jaws 35 of a second structure connected by a lever to the first and locked in position. Part 36 is a tubular container receiving the compressed air through line 8. As the carburetor is clamped between plate 30a and its support 30, the latter may adopt the position around axis 34—34 which it must have when in use.

Figure 7:
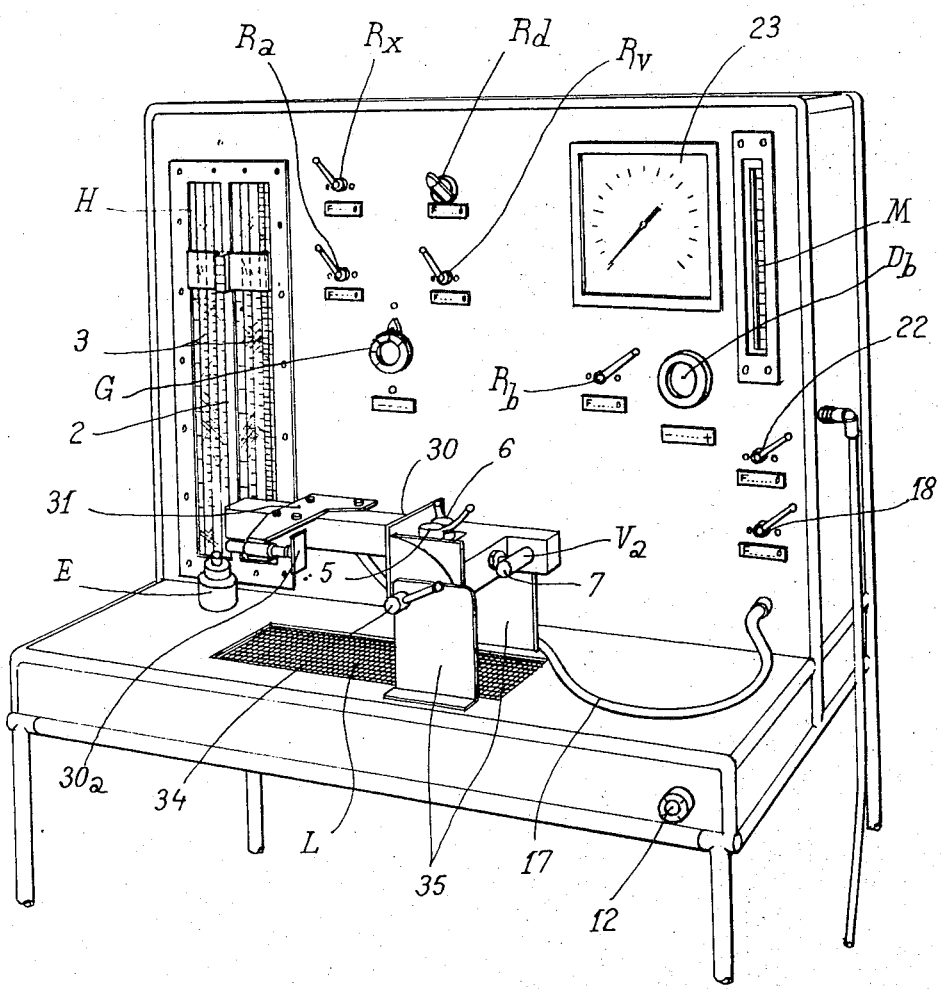
FIG. 7 is a perspective view of the overall apparatus.

FIG. 7 shows an embodiment of the invention in the form of a mount carrying the control units. $R_d$ indicates the distributor of compressed air to the jack 33 after valve $R_v$ has been opened. $R_x$ is the inlet valve for compressed air to the line X.

The apparatus enables all the appropriate measurements to be carried out on any type of carburetor in order to ensure its perfect operation i.e., measurement of airflow under given opening conditions of the butterfly or butterflies; comparison of the flow through a jet with a series of standard jets in order to determine its exact caliber; measurement of gasoline flow in the carburetor which, when compared with the airflow, will enable the best mixture to be obtained; if there is gasoline loss at the carburetor, measurement of its quantity per hour; and if there is a pump for injecting gasoline when accelerating, measurement of the quantity of each pump stroke. This apparatus will thus permit manufacturers to establish a carburetion system in practical conformity with their norms, and will enable service and repair agents to check and repair if necessary the carburetors used.

For air measurement, the apparatus uses a flowmeter of a known type, based on the height of water in a glass tube manometer under the difference in the air pressures upstream and downstream, but provided with a plurality of read-off scales and associated with a drum unit carrying a series of standard jets of different calibers, in order to enable comparison of a jet under test with one of the standard jets of a large cross section so that the difference in losses of charge causes, in the common pipe connecting the two jets with the glass tube of the manometer of the flowmeter, an excess pressure whose measurement provides the difference in calibration between the two jets.

For gasoline measurement, the device comprises a metering system in which gasoline, contained in an enclosed tank, is passed by air under pressure into a vertical test tube, passing through a central tube which flows at its top end into the test tube, allowing the latter to be filled with a strictly known and constant quantity of gasoline, after which, when the gasoline consumption operation has been carried out, the drop in gasoline level in the test tube will thus provide the precise measurement of this consumption.

The invention further involves certain mechanical arrangements enabling simple examination of a carburetor in its various positions of normal use.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for monitoring and regulating carburetors and other gasoline-consumption devices, comprising a graduated test tube, means to subject said tube at its upper part to a predetermined pressure by connection with the float chamber of a carburetor to be tested, a gasoline inlet tube which, at its upper end opens into the test tube for discharging gasoline therein, a tank for containing gasoline, a direct first connection between the lower end of the gasoline inlet tube and the base of the tank, a second connection between the lower end of the gasoline inlet tube and the upper part of the tank, a valve within the second connection for introducing into the test tube a quantity of gasoline at a strictly metered and constant pressure upon manipulation of the valve, and means to apply said pressure to said second connection.

2. Apparatus according to claim 1, comprising a vessel, a third connection between the tank and the vessel for feeding gasoline from the vessel to the tank, a pneumatically operated valve within the third connection and that closes upon the application of air pressure, and means to apply air pressure to said third connection.

3. Apparatus according to claim 2, comprising a fourth connection between the top of the test tube and the vessel, and a float needle within the fourth connection for limiting excess gasoline passed into the test tube above the gasoline inlet tube.

4. Apparatus according to claim 1, and a flowmeter for measuring air-passage cross sections, the flowmeter including a manometer tube, means to connect the flowmeter to an air passage of a carburetor to be tested, and means to supply air under pressure to the flowmeter.

5. Apparatus according to claim 4, comprising an airway which is automatically closable and is adapted to receive a jet for testing, and a drum unit for carrying a plurality of standard jets, the flowmeter comprising as many read-off scales as there are jets in the drum, so as to enable verification of the calibration of the test jet according to the difference between its resistance to the passage of air relative to that of a selected jet carried by the drum.

6. Apparatus according to claim 5, wherein the drum unit comprises a first disc rotatable about the axis of the drum and carrying the standard jets, a second disc fixed and pierced by a single hole juxtaposable with a selected standard jet carried by the first disc for comparison with the jet under test, the discs forming a diaphram dividing the drums into a first compartment for receiving air under pressure and a second compartment communicating with the airway.

7. Apparatus according to claim 4, and an air inlet, a connection between the air inlet and the flowmeter, an expansion valve within the last-mentioned connection, a pneumatically operated valve, and a connection between the air inlet and the pneumatically operated valve and leading from upstream of the expansion valve, the pneumatically operated valve being closed when under pressure for air flow measurement and open when not under pressure for gasoline flow measurement.

8. Apparatus according to claim 1, and a swingable support for the device to be tested, and a pneumatic jack for clamping the device to be tested on the support in its position of normal use.

9. Apparatus according to claim 8, and a mount carrying the swingable support and the jack and embodying the remaining parts of the apparatus in one assembly.

* * * * *